United States Patent
Semrau et al.

(10) Patent No.: US 11,381,067 B2
(45) Date of Patent: Jul. 5, 2022

(54) METHOD FOR PRODUCING AN EXPLOSION-PROOF LINE BUSHING, AND EXPLOSION-PROOF LINE BUSHING

(71) Applicant: R. Stahl Schaltgeräte GmbH, Waldenburg (DE)

(72) Inventors: Holger Semrau, Satteldorf (DE); Maxim Kutsch, Heilbronn (DE)

(73) Assignee: R. Stahl Schaltgeräte GmbH, Waldenburg (DE)

( * ) Notice: Subject to any disclaimer, the term of this patent is extended or adjusted under 35 U.S.C. 154(b) by 131 days.

(21) Appl. No.: 16/759,092

(22) PCT Filed: Oct. 23, 2018

(86) PCT No.: PCT/EP2018/079021
§ 371 (c)(1),
(2) Date: Apr. 24, 2020

(87) PCT Pub. No.: WO2019/081498
PCT Pub. Date: May 2, 2019

(65) Prior Publication Data
US 2020/0343707 A1   Oct. 29, 2020

(30) Foreign Application Priority Data
Oct. 27, 2017   (DE) .................. 10 2017 125 205.3

(51) Int. Cl.
*H02G 3/22* (2006.01)
*F16L 5/04* (2006.01)
(Continued)

(52) U.S. Cl.
CPC ................. *H02G 3/22* (2013.01); *F16L 5/04* (2013.01); *F16L 5/10* (2013.01); *F16L 57/04* (2013.01);
(Continued)

(58) Field of Classification Search
CPC .... H02G 3/22; F16L 5/10; F16L 57/04; F16L 57/00; H01B 17/308; A62C 2/065; E04B 1/941
See application file for complete search history.

(56) References Cited

U.S. PATENT DOCUMENTS

2010/0059939 A1   3/2010   Davison
2015/0354738 A1*  12/2015  Morse ................. H02G 3/0481
                                                           285/39
2016/0076673 A1   3/2016   Rule et al.

FOREIGN PATENT DOCUMENTS

DE    1 262 402 B    3/1968
DE    24 32 384 A1   1/1976
(Continued)

*Primary Examiner* — Babajide A Demuren
(74) *Attorney, Agent, or Firm* — Blank Rome LLP

(57) ABSTRACT

An explosion-proof line bushing and method for producing the line bushing. A prespecified amount of elastomeric material is applied to a line and completely surrounds the line in a flat section in the circumferential direction. The line is inserted into a passage opening of a bushing body. The bushing body is preferably plastically deformed. After the plastic deformation, the elastomeric material substantially fills the volume remaining between the formed bushing body and line. The elastomeric material is elastically deformed and presses both against the line and the formed bushing body so that flame-proof gaps are formed between the bushing body and the line. The applied mass of the elastomeric material is determined depending on the inner volume between the formed bushing body and the line remaining.

13 Claims, 3 Drawing Sheets

(51) Int. Cl.
*F16L 5/10* (2006.01)
*F16L 57/04* (2006.01)
*H02G 3/06* (2006.01)
*H01B 17/30* (2006.01)

(52) U.S. Cl.
CPC ......... *H02G 3/0658* (2013.01); *H01B 17/308* (2013.01)

(56) References Cited

FOREIGN PATENT DOCUMENTS

| | | | | |
|---|---|---|---|---|
| DE | 102011110380 B3 * | 7/2012 | ............... | H02G 3/22 |
| DE | 10 2012 111 270 A1 | 5/2014 | | |
| DE | 10 2015 112 284 A1 | 2/2017 | | |
| DE | 102015112287 A1 * | 2/2017 | ............. | H02G 3/088 |
| EP | 0 005 294 A1 | 11/1979 | | |
| JP | 2010-503374 A | 1/2010 | | |
| WO | WO-2017016818 A1 * | 2/2017 | ............... | H02G 3/22 |

* cited by examiner

METHOD FOR PRODUCING AN EXPLOSION-PROOF LINE BUSHING, AND EXPLOSION-PROOF LINE BUSHING

CROSS-REFERENCE TO RELATED APPLICATIONS

This application is a national stage of PCT/EP2018/079021 filed Oct. 23, 2018 which claims priority to German Patent Application No. 10 2017 125 205.3, filed Oct. 27, 2017, the entirety of all of which are incorporated by reference herein.

TECHNICAL FIELD

The invention refers to a method for producing an explosion-proof line bushing as well as such an explosion-proof line bushing. The explosion-proof line bushing serves to feed a line with at least one electric and/or optic and/or fluidic conductor in an explosion-proof manner through an opening, e.g. a wall opening of an explosion-proof housing. Thus, the line can be led from an explosion-proof area or housing in an explosive atmosphere.

The line can comprise multiple similar or different conductors. For example it can comprise at least one electric conductor and/or one optical conductor. Additionally or alternatively, at least one fluidic conductor can be provided.

BACKGROUND

The feeding of such a line from an explosion-proof area in an explosive atmosphere requires high care and accuracy. It has to be guaranteed that hot gases, sparks, flames and other ignition sources are unable to enter the explosive atmosphere. Either the line bushing must separate the areas hermatically from each other or the remaining gaps must be configured in their cross-section and length such that they are flameproof. The compliance of the gap dimensions of a flameproof gap requires a high manufacturing accuracy during manufacturing of a line bushing. For different lines with different cross-sections or cross-sectional dimensions usually bushing bodies with exactly adapted dimensions have to be provided through which the lines can pass in an explosion-proof manner.

A line bushing is known, e.g. from DE 10 2012 111 270 A1. The line bushing has a bushing body with a bushing opening formed by an outer sleeve and an inner sleeve arranged coaxially thereto, through which the line is led. The bushing body has a crimp section of plastically deformable material. The inner sleeve is elastically deformable. By deformation of the crimp section of the bushing body an elastic deformation of the inner sleeve is achieved. Between the line and the inner sleeve or the inner sleeve and the bushing body flameproof gaps are formed.

SUMMARY

Starting from this prior art it is an object of the present invention to provide an explosion-proof line bushing that is usable for different lines.

This object is solved by a method with the features of claim 1 as well as embodiments of an inventive line bushing described herein.

A plastically deformable bushing body is part of the inventive explosion-proof line bushing. The bushing body consists preferably of a metal containing material, particularly a metallic alloy and preferably a steel alloy. The bushing body has a passage opening that passes through in axial direction that can be particularly configured as cylindrical channel.

During manufacturing of the explosion-proof line bushing first a predefined amount, particularly a predefined mass of an elastomeric material, is applied on a surface section of an outer surface of a line, e.g. on a line sheath. The line can be a cable, for example. The amount of the elastomeric material varies at least depending on the outer dimension of the line. The outer dimension of the applied elastomeric material is at each location smaller than the inner dimension of the passage opening.

The applied amount or mass of the elastomeric material can vary preferably steplessly, e.g. by selection of the radial layer thickness of the elastomeric material and/or the axial length of the elastomeric material.

The elastomeric material surrounds the surface section in circumferential direction particularly completely without gaps in circumferential direction such that the elastomeric material has a sleeve-shaped or hollow-cylindrically-shaped contour after it has been applied on the surface section. In doing so a sleeve-shaped or hollow-cylindrically-shaped elastomeric body can be formed. Its thickness and axial length can be preset in a variable manner during manufacturing of the line bushing.

Subsequently the line with the elastomeric material applied on the surface section is arranged in the passage opening of the bushing body. Preferably elastomeric material is placed approximately centered in axial direction in the passage opening.

Subsequently the bushing body is plastically deformed. In doing so a central section of the bushing body is pressed against the elastomeric material, whereby the elastomeric material deforms elastically and presses against the outer surface of the line. Thereby the axial length of the elastomeric material increases while the radial layer thickness of the elastomeric material decreases. Due to the outer pressure of the bushing body the elastomeric material closes in its elastically deformed condition remaining gaps between the elastomeric material and the bushing body as well as between the elastomeric material and the outer surface of the line completely or partly, such that between the elastomeric material and the bushing body as well as between the elastomeric material and the line a flameproof gap is formed respectively. Thereby also remaining gaps within the line, for example between leads of a multicore cable, can be reduced or closed in the area of the central section of the bushing body such that also inside the line only flameproof gaps remain.

The amount or mass of the applied elastomeric material is variably predefined in such a way that lines with different outer dimensions can be passed through bushing bodies with the same dimensions and can be crimped in a flame-proof manner. In other words bushing bodies of the same size can be used for remarkably different line cross-sections.

Due to the invention it is not necessary to provide a multiplicity of bushing bodies of different sizes that are very precisely adapted to the size of the line cross sections of the lines to be fed through.

In a preferred embodiment the elastomeric material can be provided as band-shaped material and can be wrapped on the outer surface of the line sheath. In doing so the amount or mass of the elastomeric material can be adapted as required by the situation and preferably steplessly.

It is advantageous if the elastomeric material is applied on the surface section of the outer surface of the line sheath prior the complete vulcanization of the elastomeric material.

Subsequently after the application the elastomeric material can be completely vulcanized and can form a uniform integral elastomeric body.

In preferred embodiment the elastomeric material comprises polyisobutylen. For example the elastomeric material can be a rubber mixture with polyisobutylen.

It is preferred if the elastomeric material is applied in multiple layers on the surface section of the outer surface of the line sheath. The number of layers defines the radial coating thickness of the elastomeric material. Preferably the layers that are in direct contact with each other connect to a single elastomeric body. If the elastomeric material is applied by wrapping of an elastomeric band one single layer can be created by wrapping with a respective wide elastomeric band or, if the elastomeric band is smaller than the required axial length of the elastomeric body to be created, multiple windings can be wrapped around the surface section next to each other in an axial overlapping manner.

By winding with multiple axially overlapping individual windings per layer the elastomeric body that is formed can comprise a skin surface with elevations that are created by the overlaps. Because at these locations a layer is thicker than outside of the overlapping individual windings. In this case it is advantageous, if the maximum height of the elevations relative to the adjacent areas of the skin surface that are substantially located on the same cylindrical skin surface, is smaller than the radius change of the passage opening in the central section. In doing so it is guaranteed that also with a skin surface of the elastomeric body that deviates from an ideal cylinder skin surface, no free spaces or gaps remain after deformation of the bushing body that could affect the flameproof condition.

In one embodiment the elastomeric material does not create an adhesive bond or another substance bond with the outer surface of the line. The elastomeric material is only retained in force fit or friction fit manner on the outer surface.

After the plastic deformation of the bushing body the elastomeric material fills the space between the deformed bushing body and the line substantially completely. The remaining volume of the space between the line sheath and the bushing body can be filled to at least 95% or at least to 97% or at least to 99% by the elastomeric material. The mass of the elastomeric material initially applied on the line is predefined accordingly.

It is further advantageous if the deformed bushing body has a longer axial length than the elastomeric material or than the elastomeric body. The deformed bushing body extends beyond the elastomeric material preferably on both axial sides when the explosion-proof line bushing was manufactured.

It is also preferred if the bushing body is deformed such that the deformed axial end sections have a smaller outer dimension and/or a smaller inner dimension than the deformed central section of the deformed bushing body. Preferably the end sections of the deformed bushing body abut directly at the line sheath. By means of this configuration the tightness of the line bushing can be improved and/or in addition a retaining or clamping of the line at the bushing body can be achieved in order to hinder or prevent an axial movement of the line relative to the bushing body. A potentially remaining gap between the end sections of the deformed bushing body and the line sheath is preferably free of elastomeric material.

It is preferred if the decrease of the outer dimension of the central section caused during plastic deformation of the bushing body has always the same amount independent from the outer cross-section of the line passing through. In doing so it can be achieved that the deformed bushing body comprises a bushing outer surface in the central section with the defined shape and defined dimension. The bushing outer surface can be used for creation of a flameproof gap in case the bushing body is arranged in a wall-opening or the like. In doing so it can be advantageous if the bushing outer surface is reworked after the plastic deformation by a mechanical processing like grinding and/or scalping and/or rolling or another suitable method such that the evenness and the tolerance allows the creation of a flameproof gap.

Preferably the bushing outer surface of the deformed bushing body the central section corresponds to the skin surface of a cylinder.

In its non-deformed initial condition the bushing body can comprise a hollow cylindrical shape or sleeve shape.

Preferred configurations of invention yield from the dependent claims, the description and the drawings. In the following preferred embodiments of the invention are explained in detail with reference to the attached drawings. The drawings show:

DETAILED DESCRIPTION

In FIGS. 1-5 the manufacturing of an explosion-proof line bushing 10 is schematically illustrated. The explosion-proof line bushing 10 serves to feed a line 11 in an explosion-proof manner through a wall or a wall section 12. The wall or wall section 12 separates an explosion-proof area or space from an explosive atmosphere. For example the wall section 12 can be part of an explosion-proof housing, particularly of flameproof enclosure (Ex-d).

Figure 5:
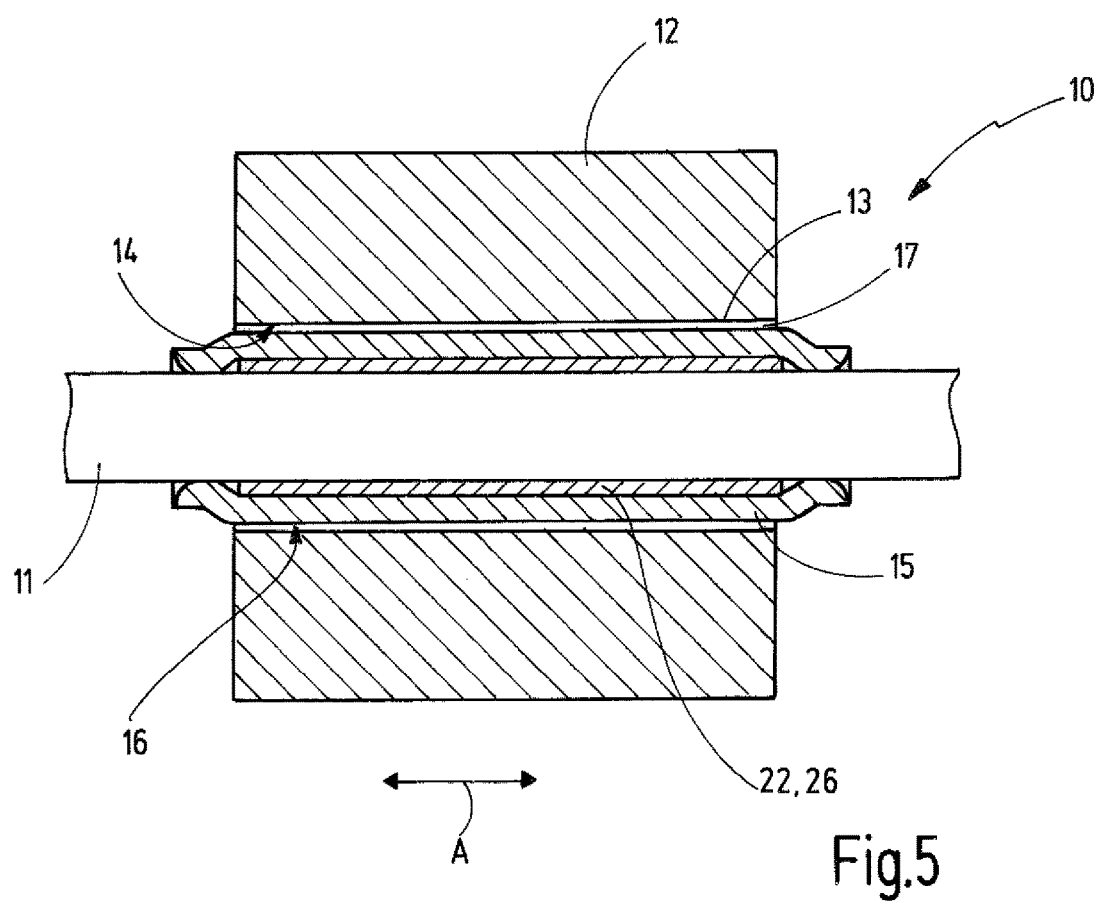

In the wall section 12 a wall opening 13 is provided (FIG. 5). The wall opening has a wall opening in a surface 14 that preferably corresponds to a cylinder skin surface. A bushing body is part of the line bushing 10. In case of a completely established explosion-proof line bushing 10 the bushing body 15 is plastically deformed and/or worked (FIG. 5) and thus forms a bushing outer surface 16 that is assigned to the wall opening 13 or the wall opening inner surface 14. When arranging the section of the bushing body 15 in the wall opening 13 the wall opening inner surface 14 and the bushing outer surface 16 commonly limit an outer flameproof gap 17. The outer flame-proof gap 17 can be closed in a ring shaped manner. It is also possible that the bushing body 15 abuts at one or more locations at the wall inner surface 14 such that the outer flameproof gap 17 is not completely closed in a ring-shaped manner and comprises an irregular gap thickness with view in cross section.

In case the flameproof connection between the bushing body 15 and the wall section 12 is established means can be provided in order to guarantee and maintain the positioning of the bushing outer surface 16 in the wall opening 13. For example fastening means or locking means can be provided in order to retain or secure the bushing body 15 in the required relative position at the wall section 12. For example the bushing body 15 can be secured or retained in a material bond manner and/or in a force fit manner and/or in a form fit manner at the wall section 12 or in the wall opening 13.

For manufacturing of the line bushing 10 in a first step (FIG. 1) an elastomeric material is applied and according to the example wrapped on the outer surface 21 of the line 11. For example the outer surface 21 can be formed by an outer surface of a line sheath. The line 11 can comprise at least one electrical conductor and/or at least one optical conductor and/or at least one fluidic conductor. It can be a multicore cable, for example.

The elastomeric material 22 is provided in the form of an elastomeric band according to the example or in an other appropriate form that allows a stepless variation of the amount or mass of the elastomeric material. The elastomeric band 23 is wrapped on a surface section 24 of the outer surface 21 in circumferential direction around the outer surface 21 such that the elastomeric material 22 completely surrounds the line 11 in the surface section 24 in circumferential direction.

Figure 1:
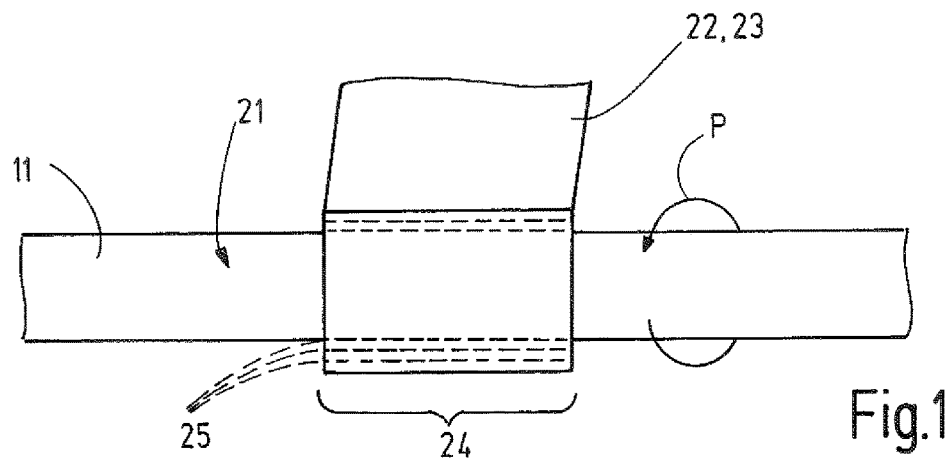
FIGS. 1-5 each show a step during the manufacturing of an explosion-proof line bushing by use of an embodiment of a bushing body as well as elastomeric material and FIGS. 6 and 7 the manufacturing of another explosion-proof line bushing by use of the bushing body of FIGS. 1-5 with a different line of larger diameter.

The elastomeric material 22 is applied in multiple layers 25 in the surface section 24 on the line 11. According to the example each layer 25 is formed by one or by multiple windings of the elastomeric band 23 that are arranged axially adjacent to each other. The wrapping of the line 11 with the elastomeric band 23 is schematically illustrated in FIG. 1 by arrow P.

Preferably each layer 25 has the same thickness radial to the extension direction of the line 11 or with view in an axial direction A, which can be achieved for example in that the width of the elastomeric band corresponds to the axial length of the surface section 24 in which the elastomeric material 22 is applied.

Figure 2:
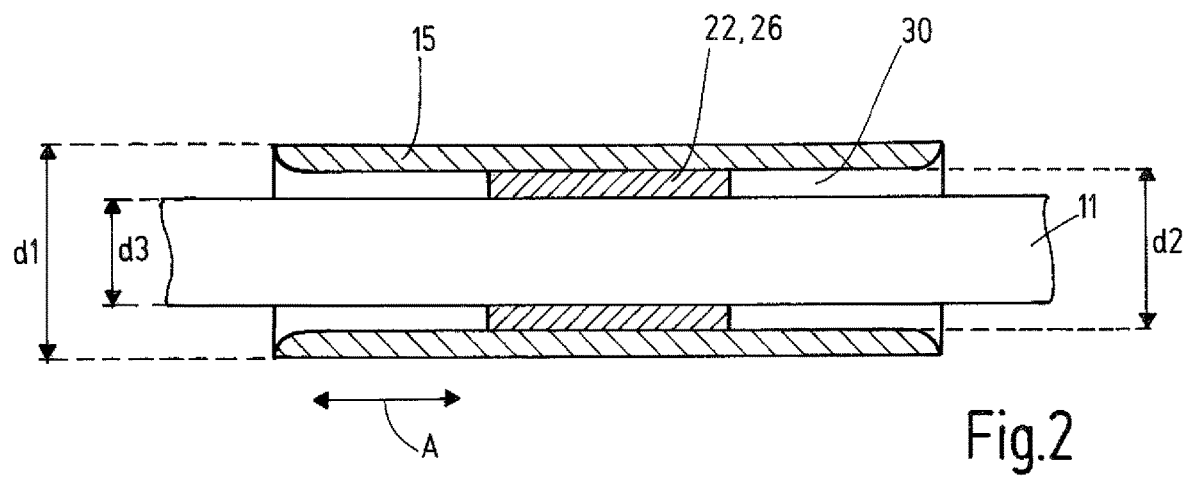

The elastomeric material 22 is preferably not completely vulcanized if it is applied on the line 11. During the application of the elastomeric material 22 directly adjacent layers 25 get into contact with each other and connect with each other. In doing so an elastomeric body 26 emerges that is manufactured from elastomeric material 22 that has a hollow cylindrical shape or sleeve shape and surrounds the line 11 in the surface section 24. Thereby an adhesive bond or substance bond between the elastomeric body 26 and the line 11 is not created (FIG. 2). The elastomeric material 22 can comprise polyisobutylen, for example.

In the next step the line 11 with the elastomeric material 22 or the elastomeric body 26 is passed through a passage opening 30 of the bushing body 15 (FIG. 2). The passage opening 30 extends completely through the bushing body 15 in an axial direction A and has a cylindrical shape in the embodiment. FIG. 2 illustrates the bushing body 15 in its non-deformed initial condition. In the embodiment it has a substantially hollow cylindrical shape or sleeve shape with a cylinder skin surface shaped outer and inner surface. The bushing body 15 has in its non-deformed initial condition an outer diameter that corresponds to a first diameter d1 and an inner diameter that corresponds to a second diameter d2. The outer dimension or the outer diameter of the elastomeric body 26 is at most as large and preferably smaller than the second diameter d2. In the embodiment the line 11 comprises an outer diameter that corresponds to a third diameter d3.

Figure 3:
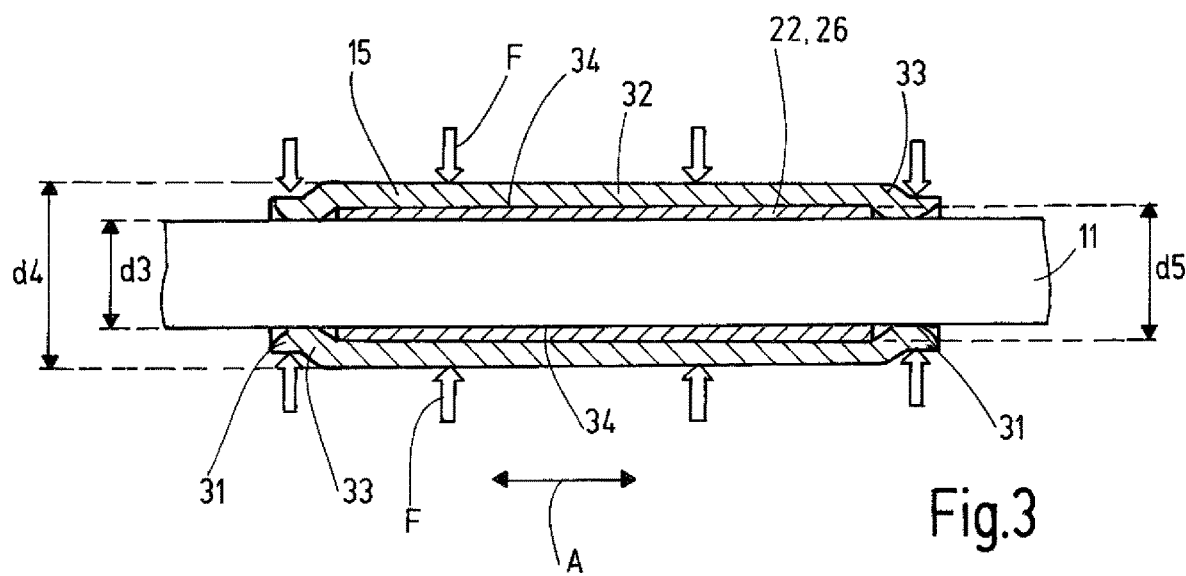
Figure 4:
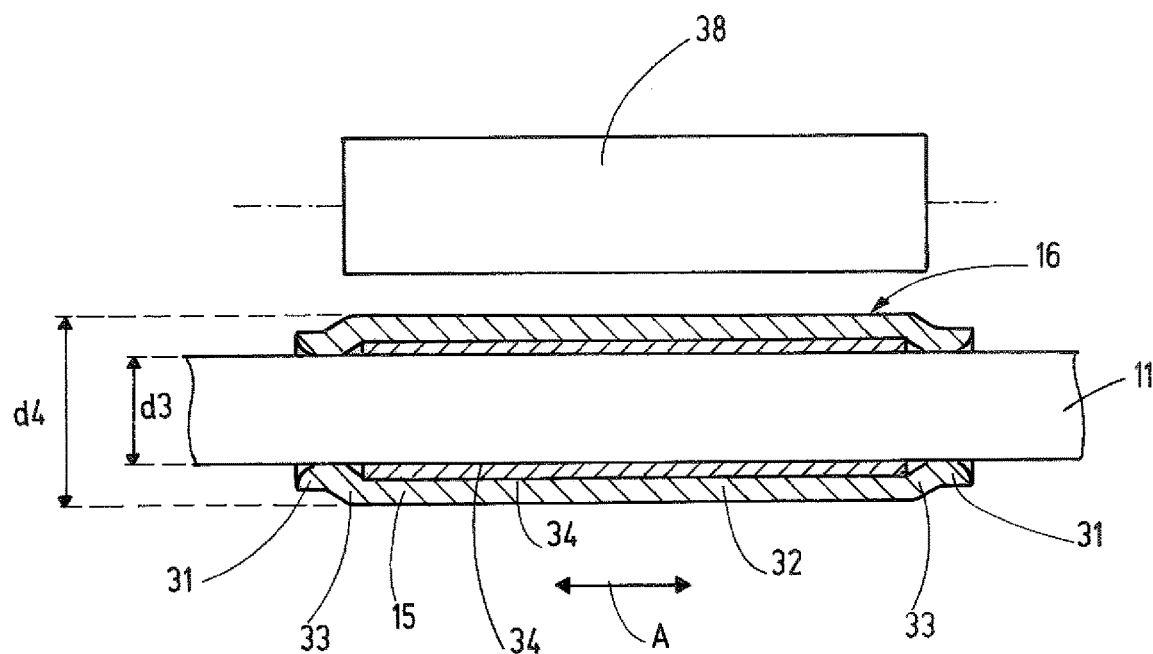

Bushing body 25 is arranged in axial direction A relative to the elastomeric body 26 such that the elastomeric body 26 is substantially centered in the passage opening 30 as schematically shown in FIG. 2. In the next step the bushing body is plastically deformed. With a suitable crimping tool (not illustrated) a deformation force F is applied on the bushing body 15 at multiple locations uniformly distributed in circumferential direction around the bushing body that is orientated radially inward to the line 11. The deformation force F is schematically illustrated in FIG. 3 by block arrows.

During the deformation the shape of the bushing body 15 is changed. The deformed bushing body 15 (FIG. 3) has several axial sections the shape of which is different from the directly adjoining axial section. According to the embodiment the deformed bushing body 15 has at each axial longitudinal end an end section 31 and a central section 32 between the two end sections 31. Each end section 31 can be connected with the central section 32 by a radially expanding or conical connecting section 33.

The central section 32 of the non-deformed bushing body 15 has an outer diameter that corresponds to a fourth diameter d4 and that is smaller than first diameter d1 in the initial condition of the bushing body 15. The central section 32 of the deformed bushing body 15 has an inner diameter that corresponds to a fifth diameter d5 and that is smaller than the second diameter d2 in the initial condition of the bushing body 15. The fifth diameter d5 is larger than third diameter d3 of the line 11.

In the embodiment the bushing body 15 is deformed from its initial condition such that the outer diameter of the end section 31 is smaller than the fourth diameter d4 of the central section 32. In addition the inner diameter of the end section 31 is smaller than the fifth diameter d5 of the central section 32. At the end sections 31 the deformed bushing body 15 can abut directly against the outer surface 21 of the line 11 and can apply a clamping force on the line 11. In doing so an axial locking of the bushing body 15 and the elastomeric body 26 relative to the line 11 is achieved.

The elastomeric material 22 applied on the line 11 in the first step has a defined mass that is preset such that the volume between the deformed bushing body 15 and the line 11 is substantially filled. The remaining volume or the remaining space is preferably filled by at least 95% and further by preferably by at least 97% and further preferably by at least 99%. The mass of the elastomeric material 22 is particularly predefined such that it completely fills the area between the central section 32 of the deformed bushing body and the line 11.

In other words the amount or mass of the elastomeric material 22 that is applied on the line 11 is determined and predefined depending on the outer diameter of the line 11 (here: third diameter d3) and the inner diameter of the deformed bushing body 15 at least in the central section 32 (here: fifth diameter d5) and the axial length of the central section 32 of the deformed bushing body 15. In doing so it is possible to use a bushing body 15 that has in its initial condition the same outer diameter and inner diameter for different line diameters of the line 11 and to that the mass of the elastomeric material 22 to be applied accordingly during the manufacturing of the line bushing 10. It has shown that in doing so lines with outer diameters from about 8 mm to 25 mm can be crimped in an explosion-proofed manner with only 8 or 10 or 12 different sizes of the bushing body 15.

After the plastic deformation of the bushing body the elastomeric body 26 is elastically deformed and presses against the inner side of the central section 32 of the deformed bushing body and against the outer surface 21 of the line 11. In doing so remaining interstices are at least partly closed such that between the deformed bushing body 15 and the elastomeric body 26 as well as between the elastomeric body 26 and the line 11 an inner flameproof gap 34 is formed respectively.

If the elastomeric material was applied in several layers 25 and one layer 25 consists of several axially adjacently applied individual windings that axially overlap slightly each layer 25 can have a larger radial thickness in the at least one overlapping area of the individual windings than outside the overlapping area. For this reason or due to other manufacturing related reasons the resulting skin surface of the elastomeric material 22 or of the elastomeric body 26 can have height deviations, particularly elevations, compared with an ideal target cylinder skin surface. In this case it is advantageous if all elevations have a height measured radially to the axial direction relative to the target cylinder skin surface that is smaller than the radius change of the passage opening in the central section 32.

The deformed bushing body 15 has the bushing outer surface 16 in the central section 32 that comprises the shape of a cylindrical skin surface in the embodiment. In order to form the outer flameproof gap 17 commonly with the wall inner surface 14 the bushing outer surface 16 can be worked in a further step after the plastic deformation of the bushing body 15 in order to comply with a pre-defined quality or tolerance. This work is illustrated highly schematically in FIG. 4. For example a rotating grinding tool 38 or another suitable working tool can be used for this working step in order to create the required surface quality and dimensional accuracy of the bushing outer surface 16.

Finally the deformed bushing body 15 attached at the line 11 can be arranged in the wall opening 13 as it has been initially described with reference to FIG. 5, and the outer flame-proof gap 17 can be formed in the wall opening 13. In doing so the line 11 can be fed through the wall opening 13 in a flameproof manner. Neither between the bushing body 15 and the line nor between the bushing body 15 and the wall opening 13 flameproof gaps 17, 34 are present such that no hot gases, sparks and flames or other ignition means can enter the explosive atmosphere.

Figure 6:
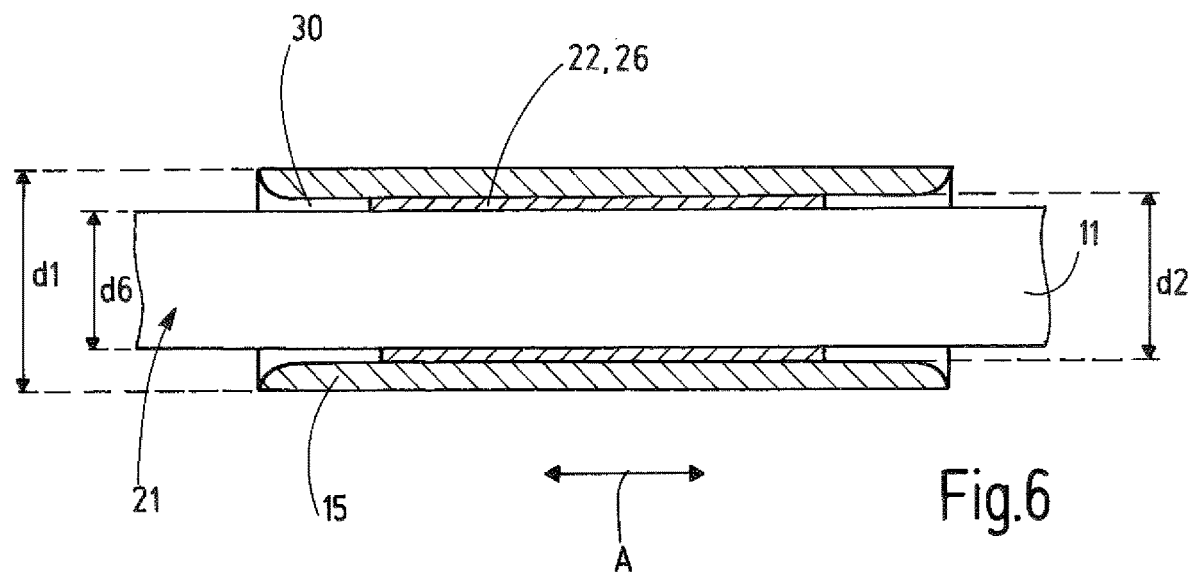
Figure 7:
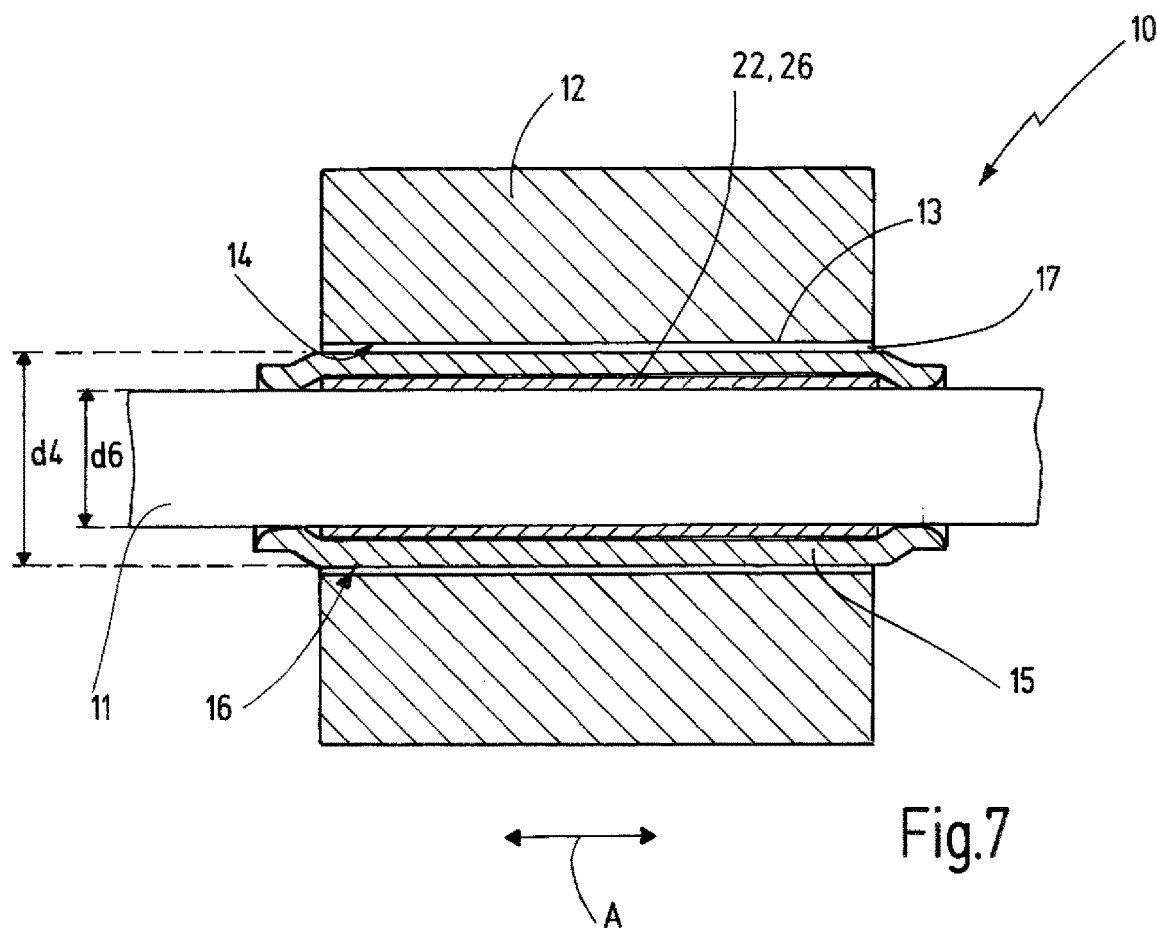

The variability of the use of the bushing body 15 for different lines 11 is schematically made clear by FIGS. 6 and 7. FIG. 6 shows the bushing body 15 of FIG. 2 in its initial condition with an outer diameter that corresponds to the first diameter d1 and with an inner diameter that corresponds to the second diameter d2. Here the line 11 has an outer diameter that corresponds to a sixth diameter d6 wherein the sixth diameter d6 is larger than the third diameter d3 of the line 11 from FIG. 2. The mass of the applied elastomeric material 22 has been adapted to the reduced volume between the line 11 and the deformed bushing body 15 (FIG. 7). In doing so it is possible to connect lines 11 with different outer diameters with a similar bushing body 15 in a flameproof manner.

In the embodiment described here the outer flame-proof gap 17 is limited by two plain cylindrical surfaces 14, 16. Alternatively to this the outer flameproof gap 17 could also comprise elevations and/or depressions. For example a part of the wall opening 13 could be formed by an inner thread and a part of the bushing body 15 or a fastening means connectable with the bushing body 15 could be provided with an outer thread that can be threaded together with the inner thread of the wall opening 13.

The invention refers to a method for manufacturing an explosion-proof line bushing 10 as well as such a line bushing 10. A predefined amount or mass of an elastomeric material 22 is applied on a line 11 that completely surrounds the line 11 in a surface section 24 in circumferential direction. The line 11 with the elastomeric material 22 is inserted in a passage opening 30 of a bushing body 15. The bushing body 15 is plastically deformed preferably over its total axial length. After plastic deformation the elastomeric material 22 fills the volume remaining between a deformed bushing body 15 and the line 11 substantially completely. The elastomeric material 22 is elastically deformed and presses against the line 11 as well as against the deformed bushing body 15 such that flameproof gaps 34 are formed between the bushing body 15 and the line 11. The applied mass of the elastomeric material 22 is determined and predefined depending on the inner volume remaining between the deformed bushing body 15 and the line 11 after deformation of the bushing body 15. Thus the mass of the elastomeric material 22 depends at least from the outer dimension of the line 11. Bushing bodies 15 having the same dimensions can thus be used for lines 11 with different outer dimensions.

LIST OF REFERENCE SIGNS 10 line bushing
11 line
12 wall
13 wall opening
14 wall opening inner surface
15 bushing body
16 bushing outer surface
17 outer flameproof gap
21 line outer surface
22 elastomeric material
23 elastomeric
24 surface section
25 layer of the elastomeric material
26 elastomeric body
30 passage opening
31 end section
32 central section
33 conical connecting section
34 inner flameproof gap
38 grinding tool
A axial direction
d1 first diameter
d2 second diameter
d3 third diameter
d4 fourth diameter
d5 fifth diameter
d6 sixth diameter
F deformation force

The invention claimed is:

1. A method for manufacturing an explosion-proof line bushing, the method comprising:
   providing a plastically deformable bushing body with a passage opening;
   applying a predefined amount of elastomeric material on a surface section of an outer surface of a line, wherein the amount of the elastomeric material is predefined depending at least on the outer dimension of the line;
   arranging of the surface section of the line with the elastomeric material in the passage opening of the bushing body; and
   plastically deforming the bushing body such that a deformed central section of the bushing body elastically deforms and presses the elastomeric material against the outer surface of the line such that between the deformed bushing body and the elastomeric material as well as the elastomeric material and the line a flameproof gap is formed respectively,
   wherein the elastomeric material is applied on the surface section of the outer surface of the line prior to the complete vulcanization of the elastomeric material.

2. The method according to claim 1, wherein the elastomeric material is applied in multiple layers on the surface section of the outer surface of the line.

3. The method according to claim 2, wherein due to direct contact with each other the layers of the elastomeric material connect with each other to a singular elastomeric body.

4. The method according to claim 1, wherein the elastomeric material is applied on the surface section without formation of a substance bond with the line.

5. The method according to claim 1, wherein the elastomeric material completely surrounds the surface section in circumferential direction.

6. The method according to claim 1, wherein the elastomeric material is provided as band shaped material and is wrapped on the surface section of the outer surface of the line.

7. The method according to claim 1, wherein the elastomeric material fills the space between the deformed bushing body and the line substantially completely.

8. The method according to claim 1, wherein the bushing body is deformed such that the deformed axial end sections have a smaller outer dimension than the deformed central section of the bushing body.

9. The method according to claim 1, wherein the bushing body is deformed such that the deformed axial end sections have a smaller inner dimension than the deformed central section of the bushing body.

10. The method according to claim 1, wherein the end sections of the deformed bushing body abut directly against the outer surface of the line.

11. The method according to claim 1, wherein the deformed bushing body has a larger axial length than the elastomeric material.

12. The method according to claim 1, wherein the bushing body has a hollow cylindrical shape in its non-deformed initial condition.

13. A method for manufacturing an explosion-proof line bushing, the method comprising:

providing a plastically deformable bushing body with a passage opening;

applying a predefined amount of elastomeric material on a surface section of an outer surface of a line, wherein the amount of the elastomeric material is predefined depending at least on the outer dimension of the line;

arranging of the surface section of the line with the elastomeric material in the passage opening of the bushing body; and plastically deforming the bushing body such that a deformed central section of the bushing body elastically deforms and presses the elastomeric material against the outer surface of the line such that between the deformed bushing body and the elastomeric material as well as the elastomeric material and the line a flameproof gap is formed respectively, wherein the end sections of the deformed bushing body abut directly against the outer surface of the line.

* * * * *